United States Patent
Yang et al.

(10) Patent No.: US 11,895,495 B2
(45) Date of Patent: Feb. 6, 2024

(54) ENHANCED SECURITY FOR ACCESS STRATUM TRANSMISSION

(71) Applicant: Apple Inc., Cupertino, CA (US)

(72) Inventors: Xiangying Yang, Cupertino, CA (US); Elliot S. Briggs, Santa Cruz, CA (US); Samuel D. Post, San Jose, CA (US); Yannick L. Sierra, San Francisco, CA (US); Fangli Xu, Beijing (CN); Dawei Zhang, Saratoga, CA (US); Haijing Hu, Beijing (CN); Huarui Liang, Beijing (CN); Li Li, Los Altos, CA (US); Lijia Zhang, Beijing (CN); Shu Guo, Beijing (CN); Yuqin Chen, Shenzhen (CN)

(73) Assignee: Apple Inc., Cupertino, CA (US)

( * ) Notice: Subject to any disclaimer, the term of this patent is extended or adjusted under 35 U.S.C. 154(b) by 575 days.

(21) Appl. No.: 17/057,622

(22) PCT Filed: Jun. 22, 2018

(86) PCT No.: PCT/CN2018/092396
§ 371 (c)(1),
(2) Date: Nov. 20, 2020

(87) PCT Pub. No.: WO2019/241999
PCT Pub. Date: Dec. 26, 2019

(65) Prior Publication Data
US 2021/0204129 A1 Jul. 1, 2021

(51) Int. Cl.
*H04W 12/069* (2021.01)
*H04W 76/27* (2018.01)
(Continued)

(52) U.S. Cl.
CPC ....... *H04W 12/069* (2021.01); *H04W 12/108* (2021.01); *H04W 12/73* (2021.01); *H04W 74/0833* (2013.01); *H04W 76/27* (2018.02)

(58) Field of Classification Search
CPC . H04W 12/069; H04W 12/108; H04W 12/73; H04W 74/0833; H04W 76/27; H04L 63/126
See application file for complete search history.

(56) References Cited

U.S. PATENT DOCUMENTS

| 2008/0049671 A1* | 2/2008 | Koo | H04W 74/0833 370/329 |
| 2010/0067495 A1* | 3/2010 | Lee | H04W 74/0866 370/335 |

(Continued)

FOREIGN PATENT DOCUMENTS

| CN | 105792194 A | 7/2016 |
| CN | 108141742 | 4/2017 |

(Continued)

OTHER PUBLICATIONS

International Search Report and Written Opinion for Application No. PCT/CN2018/092396, dated Mar. 26, 2019; 9 pages.
(Continued)

*Primary Examiner* — Mazda Sabouri
(74) *Attorney, Agent, or Firm* — Kowert, Hood, Munyon, Rankin & Goetzel, P.C.

(57) ABSTRACT

This disclosure relates to techniques, base stations, and user equipment devices (UEs) for performing base station authentication through access stratum signaling transmissions. The UE may operate in idle mode and may receive an authentication message from a base station through the wireless interface while operating in idle mode. The UE may determine whether a signature comprised within the authentication message is valid, and the UE may continue a
(Continued)

connection procedure with the base station based on a determination that the signature is valid. If it is determined that the signature is invalid, the UE may designate the base station as a barred base station and may perform cell re-selection. The authentication message may be one of a radio resource control (RRC) connection setup message, a special RRC message, a media access control (MAC) message, or a random access channel (RACH) message comprising a random access response (RAR) message.

20 Claims, 17 Drawing Sheets

(51) Int. Cl.
*H04W 12/73* (2021.01)
*H04W 12/108* (2021.01)
*H04W 74/08* (2009.01)

(56) References Cited

U.S. PATENT DOCUMENTS

| | | | | |
|---|---|---|---|---|
| 2010/0144313 A1* | 6/2010 | Chun | ............... | H04W 12/037 |
| | | | | 455/410 |
| 2016/0094542 A1* | 3/2016 | Lee | ............... | H04W 12/069 |
| | | | | 726/7 |
| 2018/0124697 A1* | 5/2018 | Nair | ............... | H04W 12/122 |
| 2020/0162925 A1* | 5/2020 | Miao | ............... | H04W 12/66 |

FOREIGN PATENT DOCUMENTS

| | | |
|---|---|---|
| CN | 107333247 A | 11/2017 |
| CN | 108076460 A | 5/2018 |
| WO | 2017161875 A1 | 9/2017 |
| WO | 2018070916 | 4/2018 |
| WO | 2018081042 | 5/2018 |
| WO | 2018081042 A1 | 5/2018 |

OTHER PUBLICATIONS

Extended European Search Report for EP Patent Application No. 18923105.3; 9 pages; dated Dec. 17, 2021.
INTEL "pCR to TR 33.899: FAke gNB Detection using Identity Based Signature"; 3GPP TSG SA WG3 (Security) Meeting #86 S3-170462; Sophia Antipolis, France; 4 pages. Feb. 6-10, 2017.
First Office Action for CN Application for Invention No. 201880094649.0; dated Jul. 16, 2023.

* cited by examiner

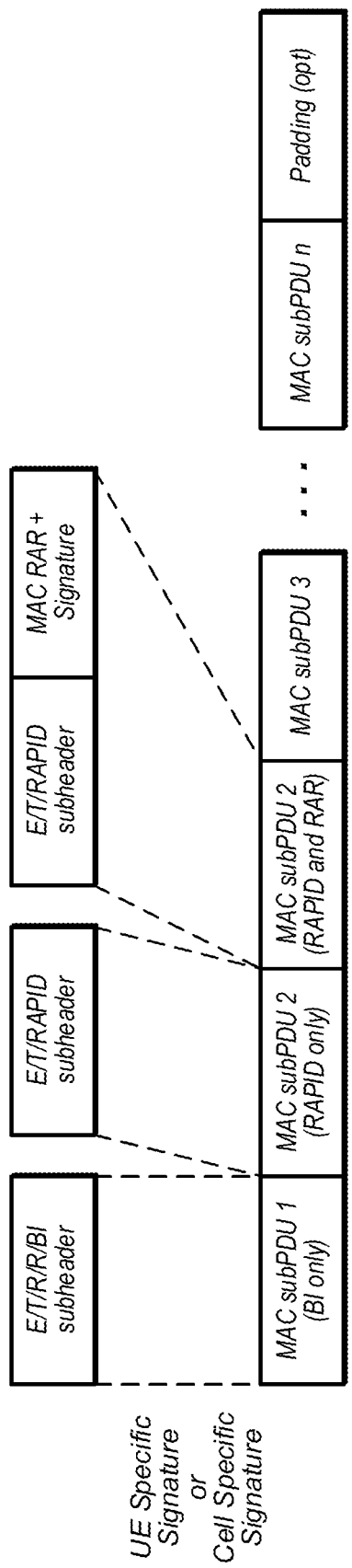
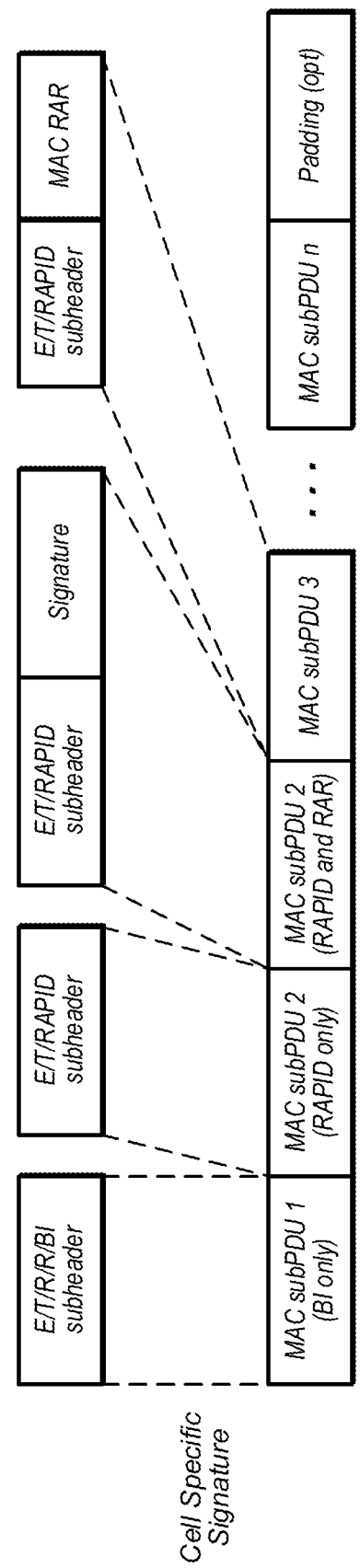
FIG. 15a
FIG. 15b

ENHANCED SECURITY FOR ACCESS STRATUM TRANSMISSION

PRIORITY CLAIM INFORMATION

This application is a national stage application of International Application No. PCT/CN2018/092396, filed on Jun. 22, 2018, titled "Enhanced Security for Access Stratum Transmission", which is hereby incorporated by reference in its entirety as though completely and fully set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, including techniques for performing authentication between a user equipment device and a base station in a wireless communication system.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communications between a user equipment device (UE) and a base station may suffer from security concerns, as a bad actor may pose as a false base station to obtain personal or other information from the UE. In order to reduce the chance of a false cell successfully impersonating a base station, improvements in the field of base station authentication may be desirable.

SUMMARY

Embodiments described herein relate to systems, apparatuses, and methods for authenticating a base station by a user equipment device (UE) through access stratum transmissions.

Some embodiments relate to a UE that includes one or more radios, a memory, and one or more processors coupled (directly or indirectly) to the radios. At least one radio is configured to perform cellular communications with a base station. The UE may perform voice and/or data communications, as well as the methods described herein.

In some embodiments, the base station may employ access stratum signaling transmission before the activation of the access stratum security mode, to authenticate the identity of the base station to the UE.

In some embodiments, the UE may operate in idle mode, and may receive an authentication message from a base station through the wireless interface while operating in idle mode. The UE may determine whether a signature comprised within the authentication message is valid, and the UE may continue a connection procedure with the base station based on a determination that the signature is valid. If it is determined that the signature is invalid, the UE may designate the base station as a barred base station and may perform cell re-selection.

In various embodiments, the authentication message may be one of a radio resource control (RRC) connection setup message, a special RRC message, a media access control (MAC) message, or a random access channel (RACH) message comprising a random access response to (RAR) message. The authentication message may be broadcast or unicast, according to various embodiments. The authentication message may be received in response to an on-demand system information request by the UE. In other embodiments, the authentication message may be received together with a contention resolution message, and the contention resolution message may be checked together with the signature. In other embodiments, the authentication message may be received as part of an initial access procedure or may be received during a Diffie-Hellman (DF) challenge-response authentication procedure.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 15a-15b illustrates the message structure involved in embedding the signature in RAR format, according to various embodiments.

Figure 1:
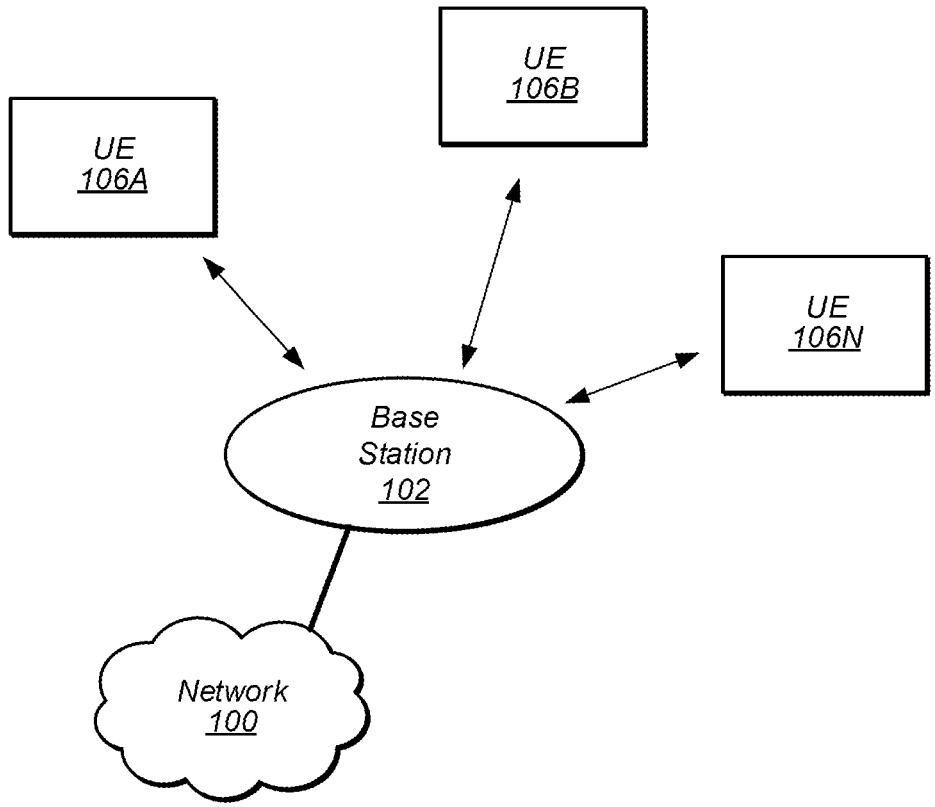
FIG. 1 illustrates an example wireless communication system according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
BS: Base Station
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology

Terminology

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™, Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". The term "Wi-Fi" is used synonymously with WLAN. A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 2:
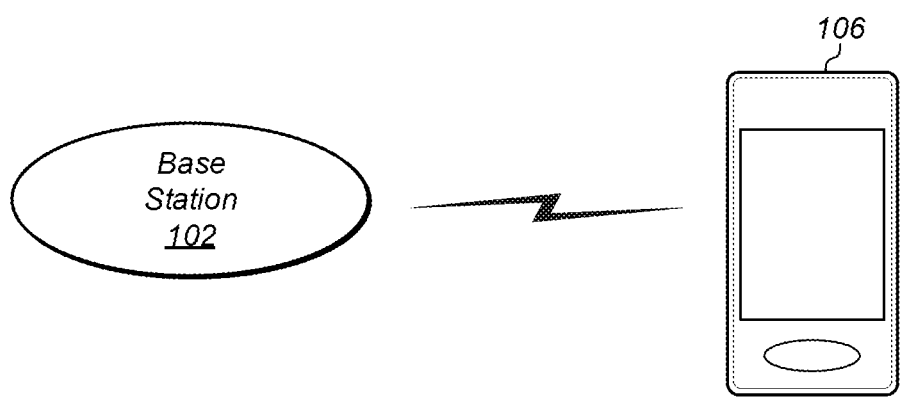
FIG. 2 illustrates a base station (BS) in communication with a user equipment (UE) device according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" or "user equipment device" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication to protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
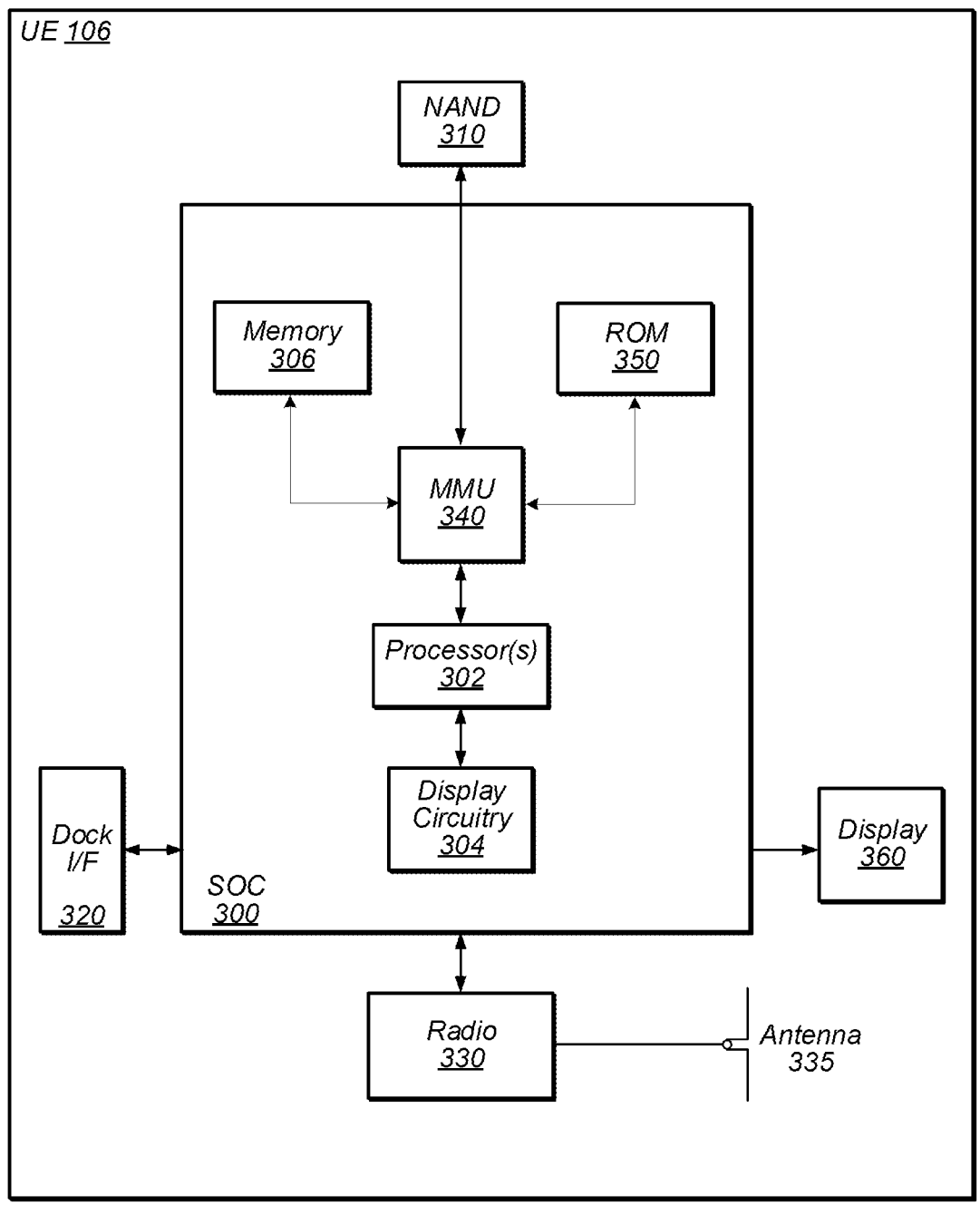
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry.

As described herein, the communication device 106 may include hardware and software components for implementing embodiments described herein for authenticating a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
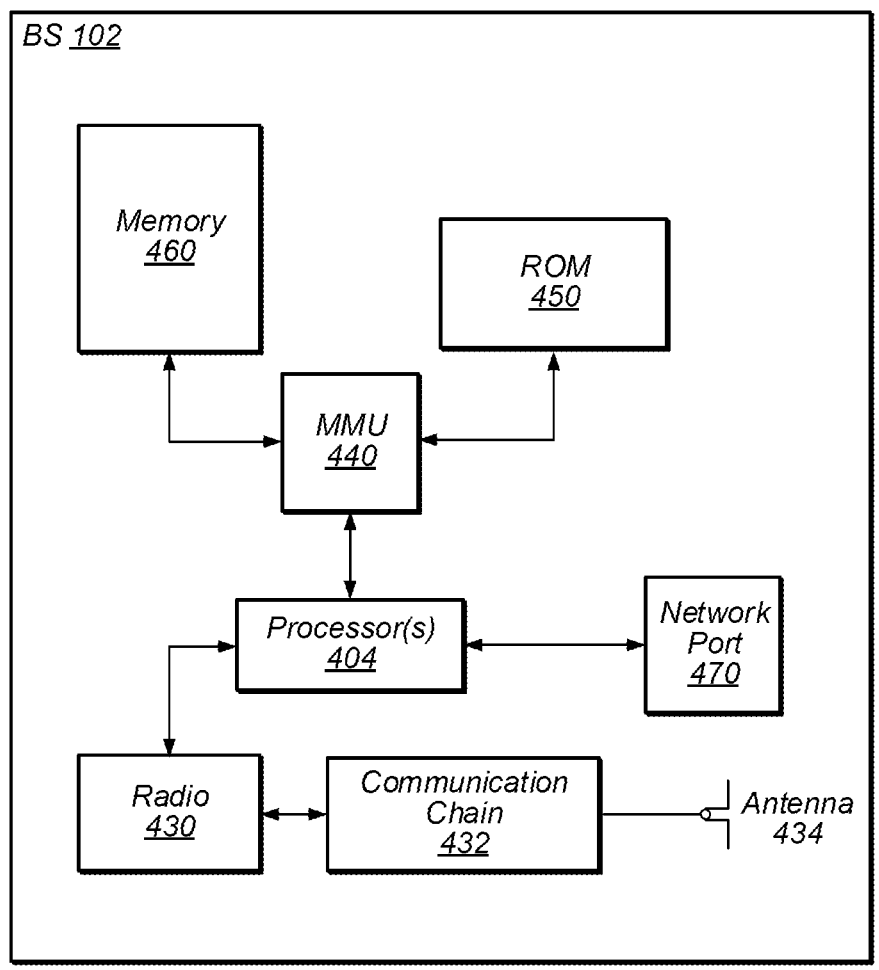
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Idle Mode Base Station Verification

In current cellular technology implementations, a user equipment device (UE) may communicate several messages with a base station (BS) on uplink and/or downlink prior to authenticating the identity of the BS. For example, when cell selection is performed by a UE in idle mode, BS authentication may not be performed until after the connection is established with the BS. For example, the legitimacy of cells may not be verified until connected mode is established via a security mode command procedure. In these implementations, it is possible that attacks may be performed on a UE before verification, e.g., by a fake base station posing as a valid base station. For example, the lack of authentication of broadcast information from base stations may enable a fake cell to undetectably act as an imposter base station. For example, an attacker may construct a cell with identical signaling as a legitimate cell, and a victim UE may unwittingly transmit identification or other comprising information while camped on a fake cell.

Figure 5:
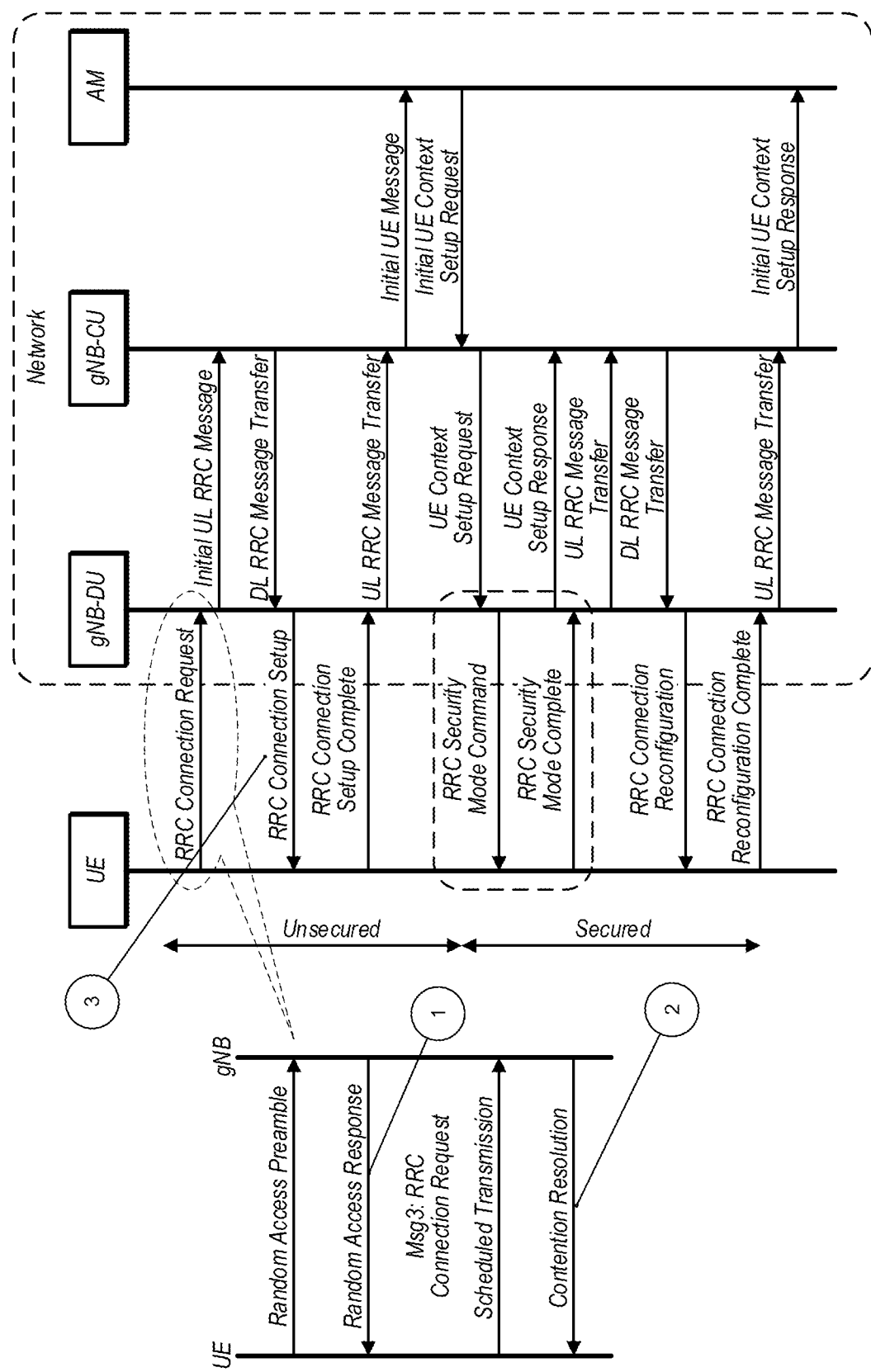
FIG. 5 is a communication flow diagram illustrating a typical initial access procedure.

FIG. 5 is a communication flow diagram illustrating a typical initial access procedure. As illustrated, the access stratum (AS) security mode is activated at step 10, and at least three transmissions (labelled 1, 2, and 3 in FIG. 5: the random access response message and the contention resolution message within the RRC connection request, as well as the RRC connection setup message) are received by the UE before the UE has established a secure connection (e.g., upon transmission of a "RRC Security Mode Complete" message to the gNB). While AS signaling transmissions subsequent to transmission of the "RRC Security Mode Complete" message may experience security protection, before the security protection has been established, an imposter base station may be able to communicate with the UE during these transmissions to obtain information from the UE.

Figure 6:
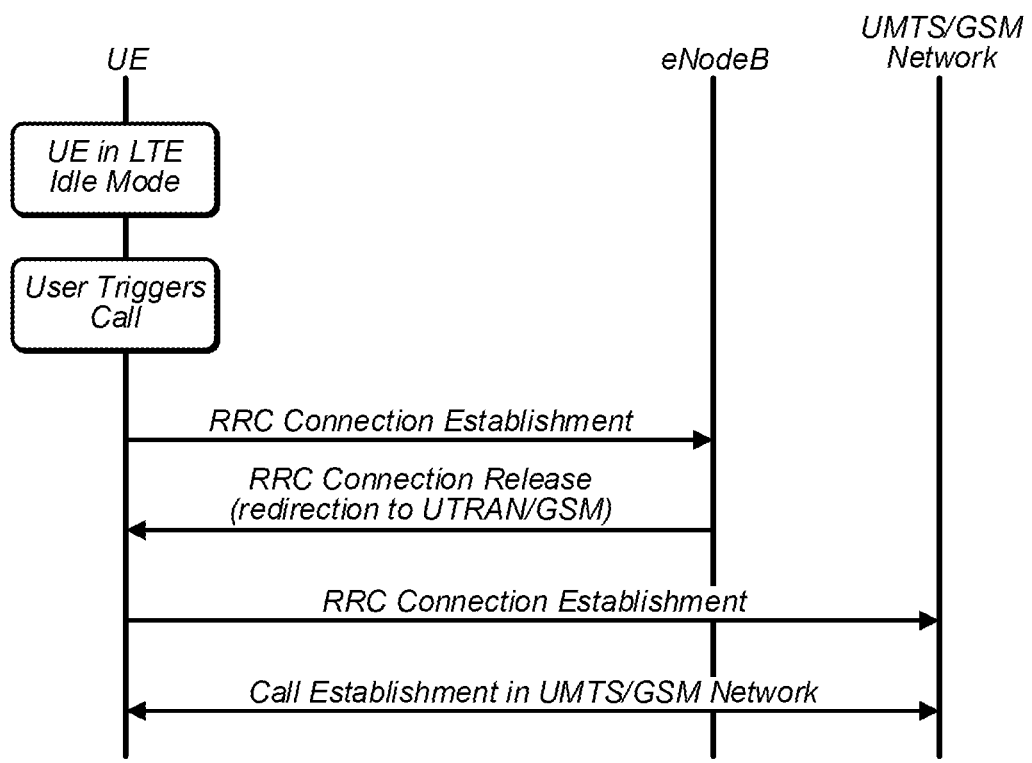
FIG. 6 is a communication flow diagram illustrating a typical redirection procedure, according to some embodiments.

An imposter base station attempting to access a UE as a fake cell may result in a variety of adverse effects. For example, as illustrated in FIG. 6, 4G networks may occasionally redirect a camped UE to a 3G or 2G network (labeled as a UMTS/GSM network in FIG. 6). In these implementations, a redirection message from the 4G base station may be transmitted before AS security mode has been activated. As a result of this unsecured usage, a fake eNB may potentially redirect a UE to access a fake 2G or 3G cell. The attacker may then exploit the low security associated with the 2G or 3G services to conduct cyberattacks on the UE. Similarly, it is anticipated that 5G NR may employ similar redirection techniques, such that a fake cell could likewise redirect a UE to a fake LTE or 2G/3G cell when the UE triggers a 5G call or data session (but before security mode has been established).

Figure 7A:
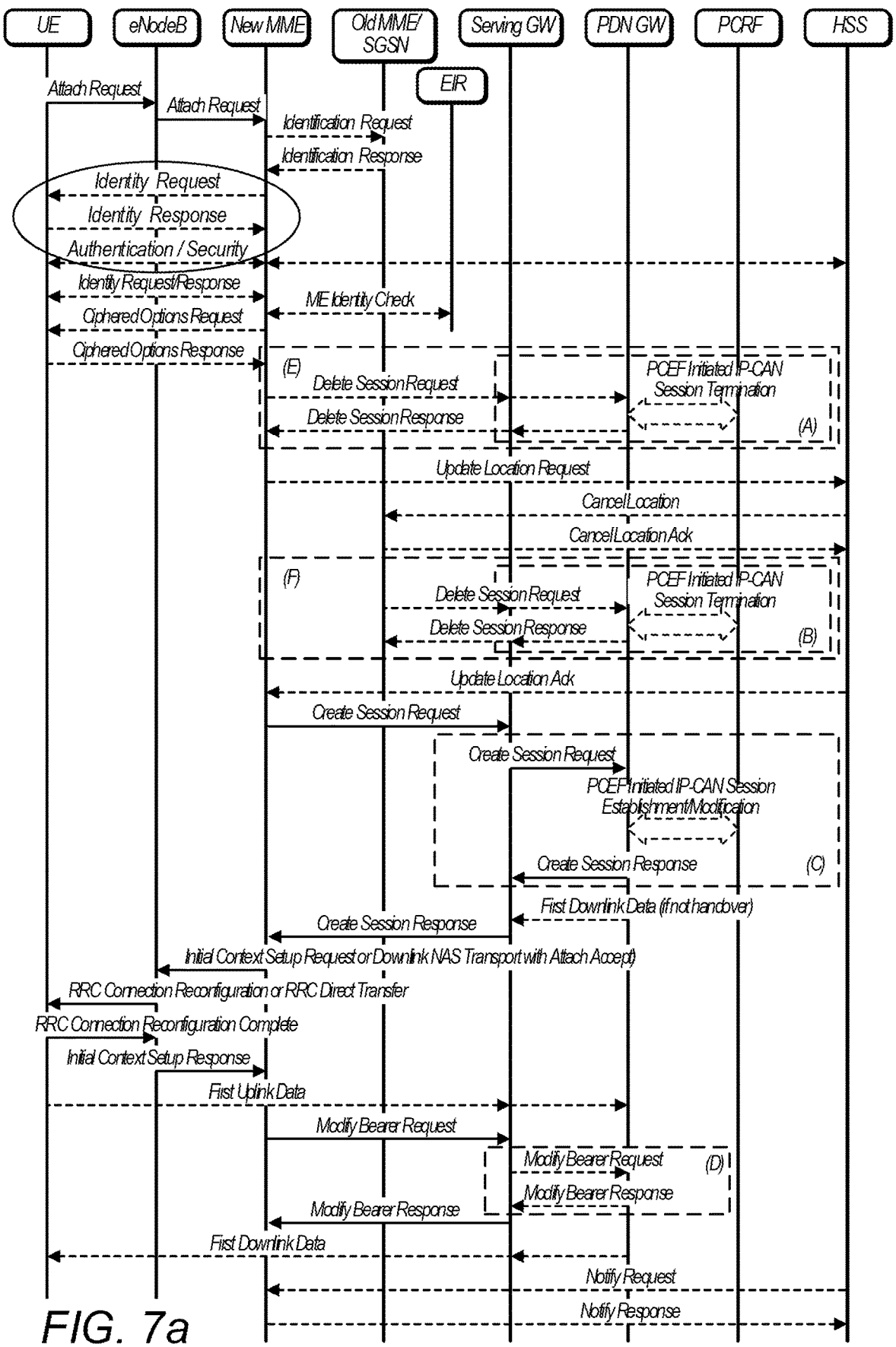
FIGS. 7a-7b are communication flow diagrams illustrating an identity request for Long-Term Evolution (LTE) and New Radio (NR) radio access technologies, according to some embodiments.
Figure 7B:
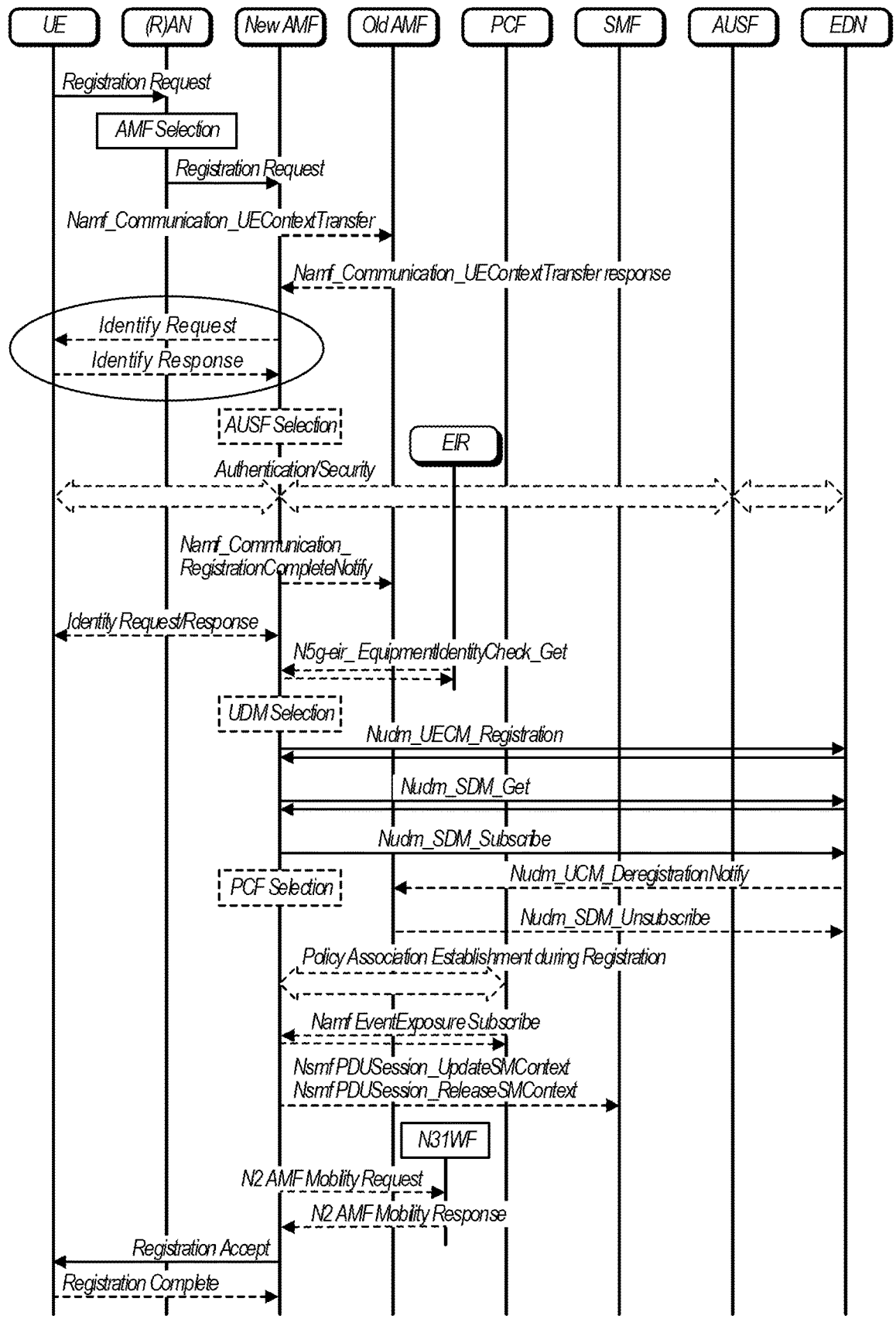

Another potentially adverse effect is UE identity acquisition. For example, as illustrated in FIGS. 7a-7b, during LTE or NR registration procedures, a UE identity request procedure may occur before AS security mode activation. FIG. 7a illustrates a typical communication flow involving an identity request for LTE communications, and FIG. 7b illustrates a typical corresponding flow for NR 5G protocols. In some implementations, a UE may transmit its identity in plaintext, such that an imposter base station may thereby acquire the UE's identity through a fake identity request procedure during unsecured transmissions. For example, a base station may request that a UE sends its international mobile subscriber identity (IMSI) if the mobile management entity (MME) fails to retrieve the UE's context via its temporary mobile subscriber identity (TMSI). Because there is no security mode possible given the lack of a security context, an attacker may use this command to obtain a victim UE's IMSI.

A third potential adverse effect of unsecured transmissions arises when system information is broadcasted without security protection. For example, Earthquake and Tsunami Warning System (ETWS)-related system information (or emergency broadcast information) may be falsely broadcast by a fake base station, leading to a popup indication on a mobile screen of one or more UEs configured to receive the emergency broadcast messages, and potentially harming social stability.

Broadly speaking, if a UE is unable to distinguish a fake cell from a genuine cell before AS security mode activation (e.g., during initial access or immediately after transitioning out of idle mode), the UE may be tricked into following a command from a fake base station, or of providing UE information or other information to the fake base station based on a request.

To address these and other concerns, embodiments herein describe enhanced security mechanisms for AS transmissions. Alternatively, embodiments herein may be extended for use in non-access stratum (NAS) transmissions. In some embodiments, a signature derived from a trusted key may be included in an existing or newly defined system information block (SIB) message transmitted by a base station. The signature may be related to the corresponding base station identity, or it may be related to a global cell identity. The signature may be transmitted together with AS signaling, to authenticate the BS identity sooner in the transmission protocol than previous implementations. As described in greater detail below, the signature may be carried in the radio resource control (RRC) layer of the MAC layer, according to some embodiments.

When a cell is suitable, the UE may verify the signature before performing cell selection. If the signature is determined to be invalid, the UE may bar the fake cell and initiate reselection to another cell. According to various embodiments, the signature may be transmitted in a broadcast message (e.g., when a UE is camped on a cell and configured to receive broadcast message) or a unicast message (e.g., when a UE performs an initial access procedure). When the signature is carried within a broadcast message, a new system information block (SIB) message may be introduced to carry the signature. Alternatively, the signature may be integrated into an existing special SIB, such as public warning system (PWS)-related SIBs, multimedia broadcast multicast services (MBMS)-related SIBs, or master information blocks (MIBs), among other possibilities. The signature may be calculated from content in other broadcast/SIB messages or the content in the same broadcast/SIB message carrying the signature, or combination of both. For example, the special SIB may be a MIB that is broadcast as part of a physical broadcast control channel (PBCH), and the signature may be transmitted together with scheduling information for an upcoming SIB (e.g., SIB1). Alternatively, the special SIB may be broadcast as a SIB1 as part of a physical downlink shared channel (PDSCH), such that the signature is transmitted together with initial access information, cell access information, and/or scheduling information for other system information blocks. Embodiments using broadcast transmissions to transmit the signature are described in further detail below.

Alternatively, when the signature is carried within a unicast message, it may be transmitted in the response to an on-demand system information (SI) request. For example, as described in greater detail below, the signature may be carried in a RAR/msg2 or Msg4 of a RACH procedure, as part of a Msg1 or Msg3 based on-demand SI request. The signature may be transmitted with a special SIB (SIB-x), which may be additionally used to transmit common cell reselection information, intra-frequency cell reselection information, inter-frequency cell reselection information, inter-RAT cell reselection information, emergency primary and/or secondary notifications, and GNSS and/or UTC information.

Figure 8:
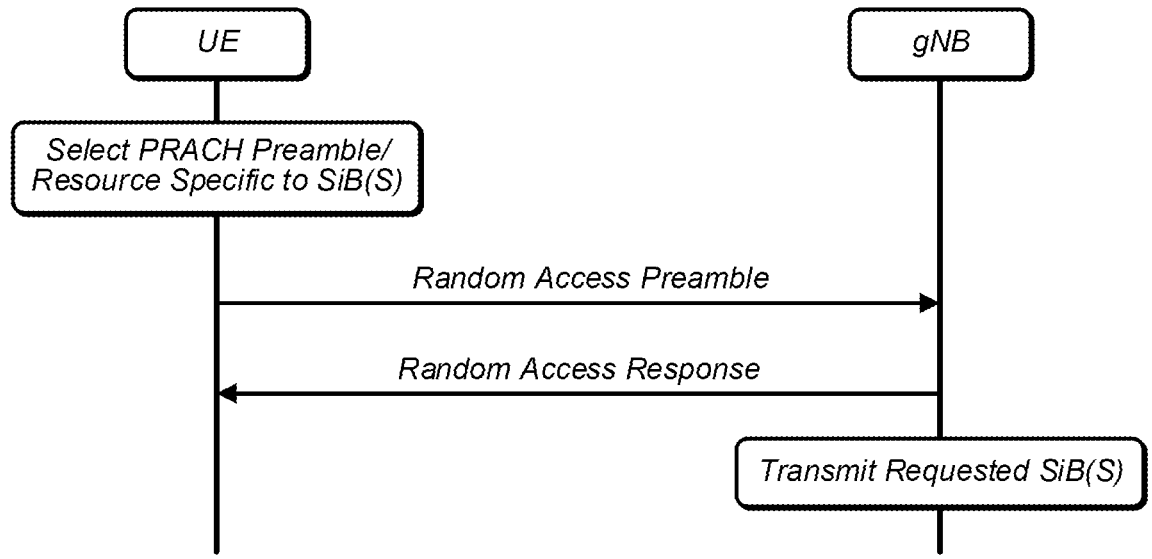
FIG. 8 is a communication flow diagram illustrating a typical msg1-based SI request, according to some embodiments.
Figure 9:
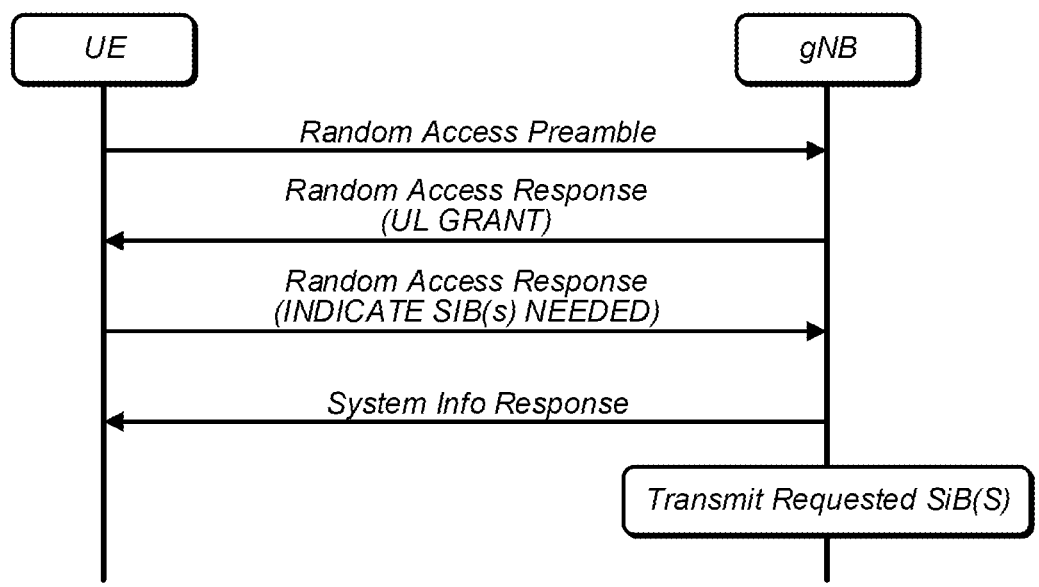
FIG. 9 is a communication flow diagram illustrating a typical msg3-based SI request, according to some embodiments.

In some embodiments, on-demand SI requests may operate according to existing protocols. For example, FIG. 8 is a communication flow diagram illustrating a typical msg1-based 2-step SI request, and FIG. 9 is a similar communication flow diagram illustrating a typical msg3-based 4-step SI request. In some embodiments, either of these protocols may be employed to request a SIB containing a signature.

Advantageously, the security processing may only take place upon initiation of cell reselection, to reduce the processing load on the UE. Further, processing latency introduced by the authentication process may be experienced while the UE is in idle mode, when timing is less critical. Entering connected mode subsequent to authentication may then utilize the usual security mode commands.

In some embodiments, it may be advantageous for a UE device to be able to verify the authenticity of a base station while roaming on a different network from its home or default network. Additionally or alternatively, public key infrastructure may provide key revocation and expiration abilities (e.g., as provided by X509 certificates).

In some embodiments, each cellular carrier may function as its own certificate authority, and carriers may provide root public keys to handset vendors. Carrier public certificates may be stored in the operating system's certificate repository, and appropriate certifications may be pushed down to baseband at the appropriate time (e.g., during an authentication procedure).

Each cellular carrier may issue unique and valid certificates to each base station, and the cellular carriers may sign the BS certificate with the root certificate's private key. The UEs may then verify the BS certificate signature with the root public key of the cellular carrier.

In some embodiments, the SIB (such as SIB16 or another SIB) may contain GPS information comprising a UTC time stamp, and the BS may sign the SIB UTC contents and nonce with a private key. The UTC timestamp may help prevent replay attacks, as the key may expire within a short time period and may be refreshed via a SIB reconfiguration. For example, if the authentication signature is repeatedly broadcast by a BS, an attacker may be able to receive and determine this broadcast signature and re-broadcast it as a fake cell. A UTC or other timestamp may reduce the likelihood of a successful replay attack by reducing the time window within which a signature is valid.

In some embodiments, a UE camps on a cell and reads essential master information blocks (MIBs) and SIBs while operating in idle mode. The BS may configure a SIB with a new signature. Prior to transitioning to connected mode, the UE may verify the signature SIB contents. After verification, the UE may trust the authenticity of the BS and may proceed with establishing a connection with the BS.

Figure 10:
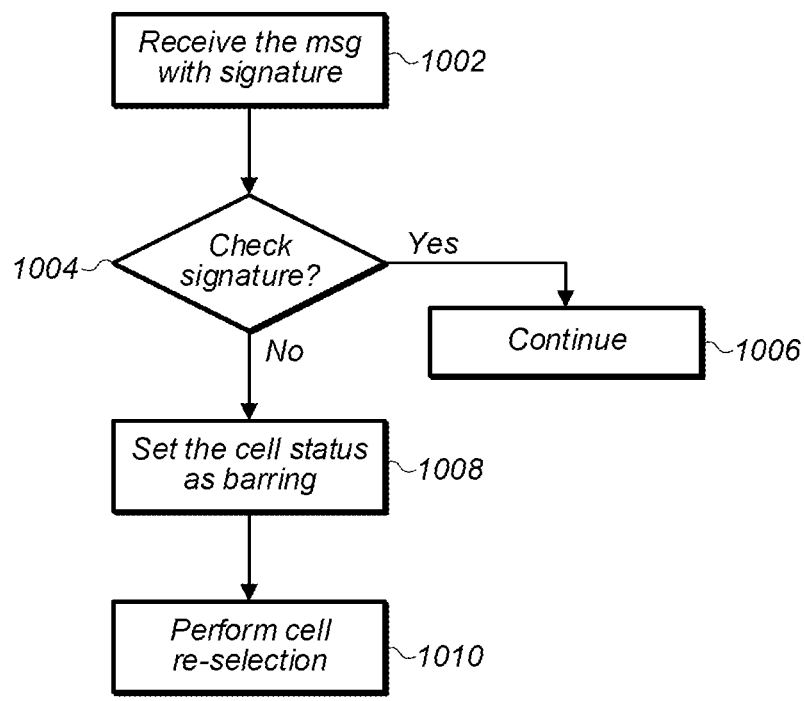
FIG. 10 is a flowchart diagram illustrating a method for a UE to perform preemptive base station authentication during AS transmissions, according to some embodiments.

FIG. 10—Flowchart for Enhanced Security for AS Transmissions

FIG. 10 is a flowchart diagram illustrating a method for a UE to perform preemptive base station authentication during AS transmissions, according to some embodiments. In various embodiments, some of the elements of the scheme shown may be performed concurrently, in a different order than shown, or may be omitted. Additional and/or alternative elements may also be performed as desired. As illustrated, the method of FIG. 10 may operate as follows.

At 1002, the UE may receive an authentication message from a base station with a signature. The UE may be operating in idle mode, and may receive the authentication message as part of an initiation of a connection procedure. For example, the UE may be instructed to exit idle mode and establish a connection with a base station, and the authentication message may be received as part of the establishment of the connection.

At 1004, the UE may check the signature to determine if the signature is valid. The UE may have one or more verification signatures pre-calculated if the base station public keys and the contents to be verified are obtained earlier than the signature, to compare to the received signature. The verification signatures may be specific to one or more wireless technology networks, vendors, or service areas.

The UE may perform a variety of actions to verify the authenticity of the BS, according to various embodiments. For example, the UE may use the root certificate authority (CA) public certification to verify the public certificate signature of the base station. The UE may check X.509 parameters and/or expiration time, according to some embodiments. The UE may check whether a UTC time stamp is within expected error limits of a global positioning satellite (GPS) or network time protocol (NTP) time stamp. The UE may perform verification of the signature once per cell in idle mode, when the UE attempts to establish a connection with the cell.

At 1006, if the signature is determined to be valid, the UE may continue to communicate with the base station. For example, if the signature message was received as part of an initial-access procedure, the UE may continue a connection procedure to establish a secure connection with the base station.

At 1008, if the UE determines that the signature is invalid, the UE may set the status of the cell as barred, to prevent reception of future transmissions from the base station. In other words, the UE may black-list the base station and avoid further communication with the base station.

At 1010, the UE may perform cell re-selection to initiate a connection procedure with another base station. Cell re-selection may then operate again according to steps 1002-1010, as the UE again attempts to verify a signature received from a second base station, until a valid base station is discovered and a secure connection established.

Specific Access Stratum Messaging Protocols

The following paragraphs detail additional embodiments describing in further detail the specific nature of the messaging structure and protocols used for access stratum BS authentication. In other words, the following paragraphs are intended to supply further detail regarding the specifics of how the method steps detailed in FIG. 10 may be implemented. The following are meant as example embodiments and are not intended to limit the scope of the disclosure in any way.

FIGS. 11a-11d—Challenge-Response Authentication

In some embodiments, a challenge-response mechanism (e.g., a Diffie-Helman, DH, challenge-response mechanism or another type of challenge-response mechanism) is used in order to prove that the base station has control of the trusted private key. Replay and relay protection for challenge-response may be solved by using an ephemeral key exchange. To reduce the window in which a UE may be vulnerable to a fake cell, it may be desirable to implement the challenge-response authentication mechanism as early as possible in the random access procedure.

Figure 11A:
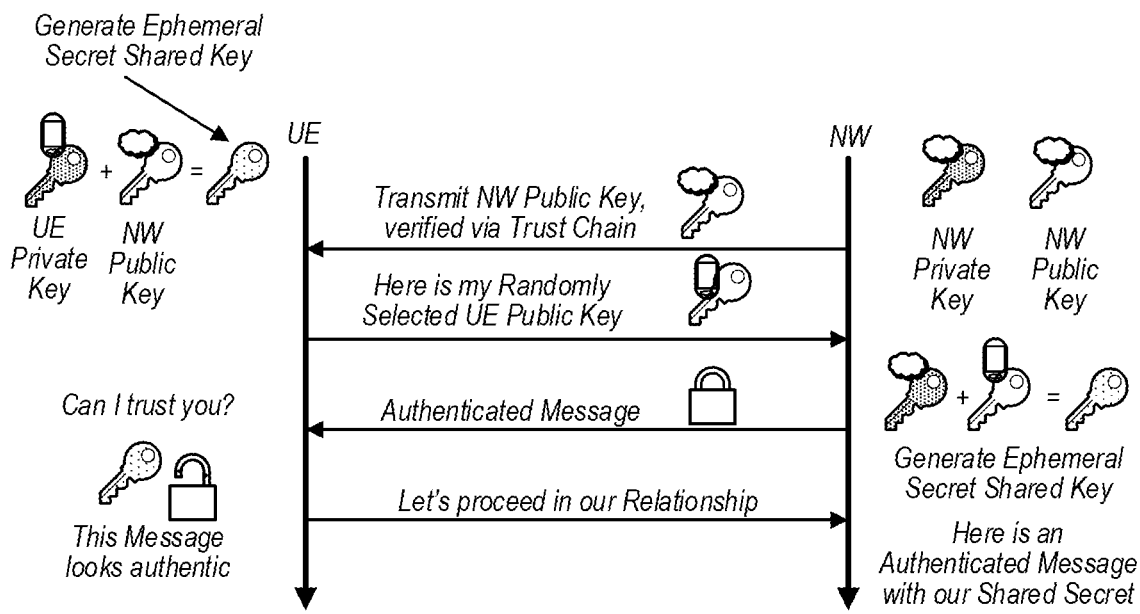
FIG. 11a is a communication flow diagram illustrating a method for performing a typical DH challenge-response authentication, according to some embodiments.

FIG. 11a is a communication flow diagram illustrating a method for performing a typical DH challenge-response authentication, according to some embodiments. As illustrated, a base station (BS) may broadcast a network public key via a verified trusted chain to a UE interested in communicating with the BS. The UE may combine the network public key with an ephemeral private key known to the UE to generate an ephemeral secret shared key. The UE may then transmit a corresponding ephemeral UE public key associated with the ephemeral private key of the UE back to the BS, which the BS may use in combination with its network private key to generate the same ephemeral secret shared key. The base station may then transmit an authentication message to the UE encoded using the secret shared key, the UE may verify using the secret shared key that the message is authentic, and the UE and the BS may then continue communicating.

Figure 11B:
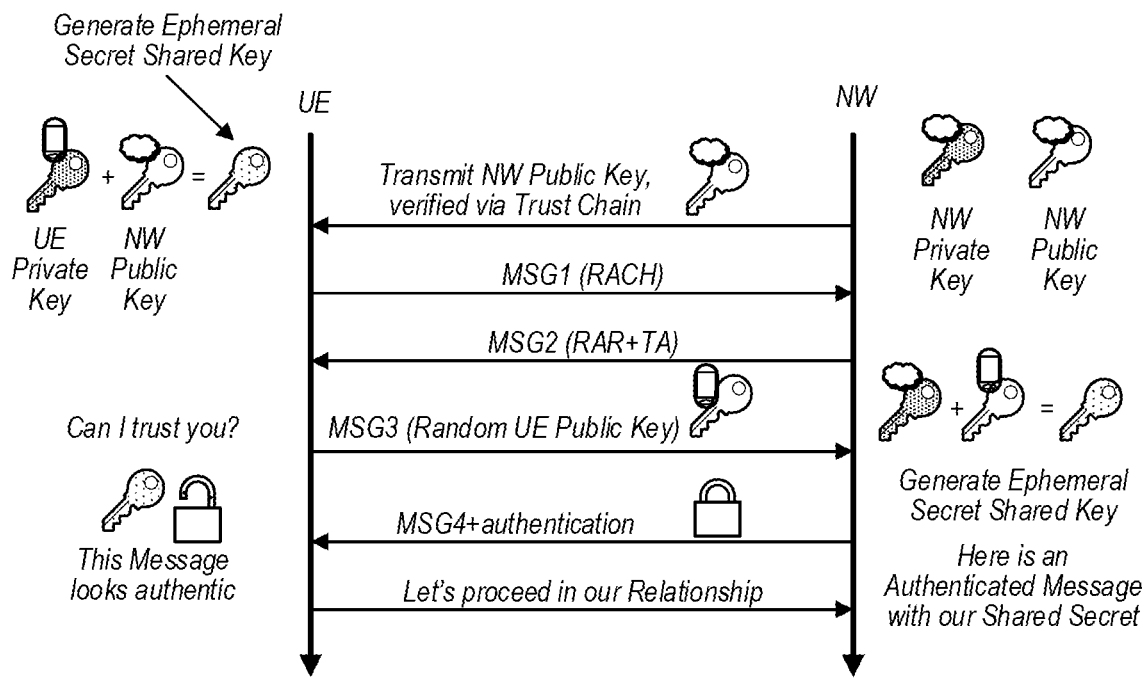
FIG. 11b is a communication flow diagram illustrating a method for performing cellular DH challenge-response authentication, according to some embodiments.

FIG. 11b is a communication flow diagram illustrating a method for performing cellular DH challenge-response authentication, according to some embodiments. FIG. 11b details a similar communication flow to FIG. 11a, but includes several extra transmissions (MSG1 RACH, and MSG2 RAR+TA) used in cellular implementations.

Figure 12:
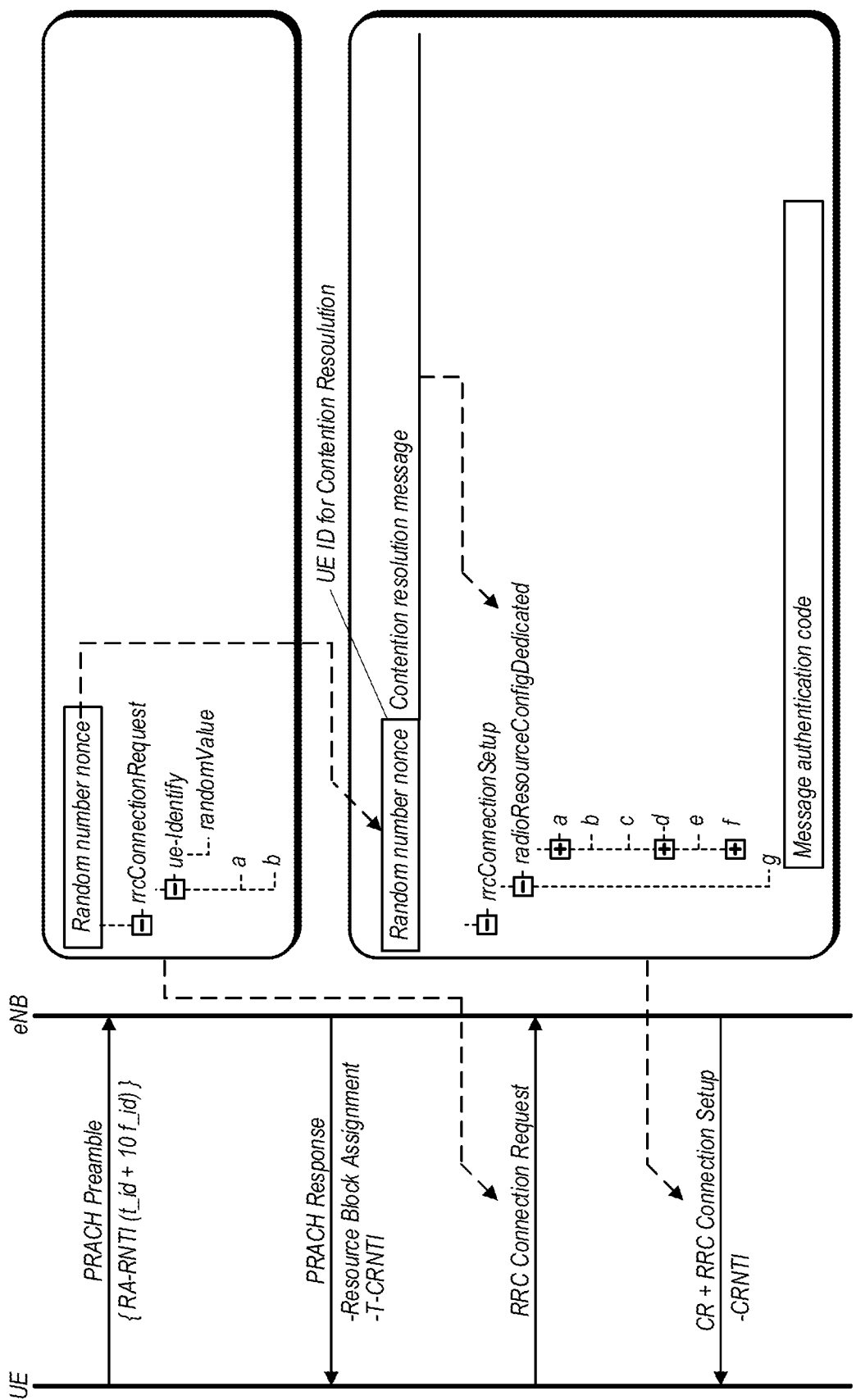
FIG. 12 illustrates a detailed message structure of MSG3, "RRC Connection Request", according to some embodiments.

According to various embodiments, the authentication signature of the BS may be embedded in different messages within the communication flow diagram of FIG. 11b. MSG3 may be utilized to embed a UE-side challenge or an ephemeral public key, in some embodiments. FIG. 12 illustrates a detailed message structure of MSG3, "RRC Connection Request", according to some embodiments. MSG3 already accommodates 40 bits, and a random value or the temporary mobile subscriber identity (TMSI) may be utilized as the UE challenge (i.e., the UE public key nonce). In some embodiments, the ephemeral public key of the DH challenge-response may replace the random. In some embodiments, the public key or random may be sent in later messages such as MSG5. For embodiments using an ephemeral public key in a DH challenge-response procedure, all messages subsequent to MSG4 may carry a message authentication code of 32-64 bits.

In some embodiments, the UE may transmit a random number, or nonce, to the BS in MSG3, and the nonce may be signed by the base station and transmitted back to the UE as a signature in MSG4+MAC. For example, in signing the random number received from the UE to obtain the signature, the base station may modify the random number by modulating the random number based on a base station identifier. in some embodiments, the base station may combine the nonce with a network private key known to the base station to obtain the same ephemeral secret key determined by the UE based on the network public key.

Figure 13A:
FIGS. 13a-13b illustrate bit allocation for a signature embedded with a contention resolution identity in a medium access control (MAC) control element (CE) message, and for a signature embedded as a stand-alone MAC CE message, according to some embodiments.
Figure 13B:

In some embodiments, MSG4 (a contention resolution message) of FIG. 11b may be utilized for transmitting the signature. The detailed message structure of MSG4 is also illustrated in the lower window of FIG. 12, "CR+RRC Connection Setup". MSG4 may need to accommodate message authentication code messaging, and the number of bits used to include the signature may be based on the particular cryptographic implementation. For example, the contention resolution message authentication code CE associated with MSG4 may be extended to include the base station ID-based signature. This is illustrated in FIG. 13a, where the 6-octet signature is appended at the end of a 6-octet UE contention resolution identity. Alternatively, the contention resolution message authentication code CE may be followed by a separate message authentication code CE with the signature embedded. This is illustrated in FIG. 13b, where the 6-octet signature is transmitted as a separate message authentication code message.

Figure 11C:
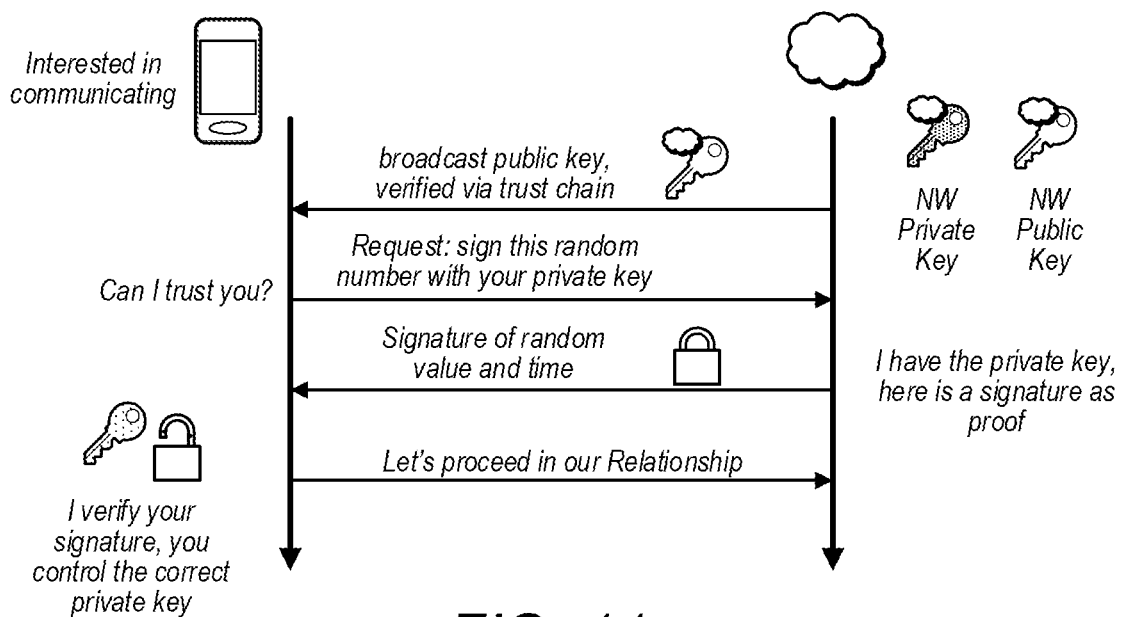
FIGS. 11c-11d illustrate similar communication flow diagrams as FIGS. 11a-11b, but with a simpler communication flow, according to some embodiments.
Figure 11D:
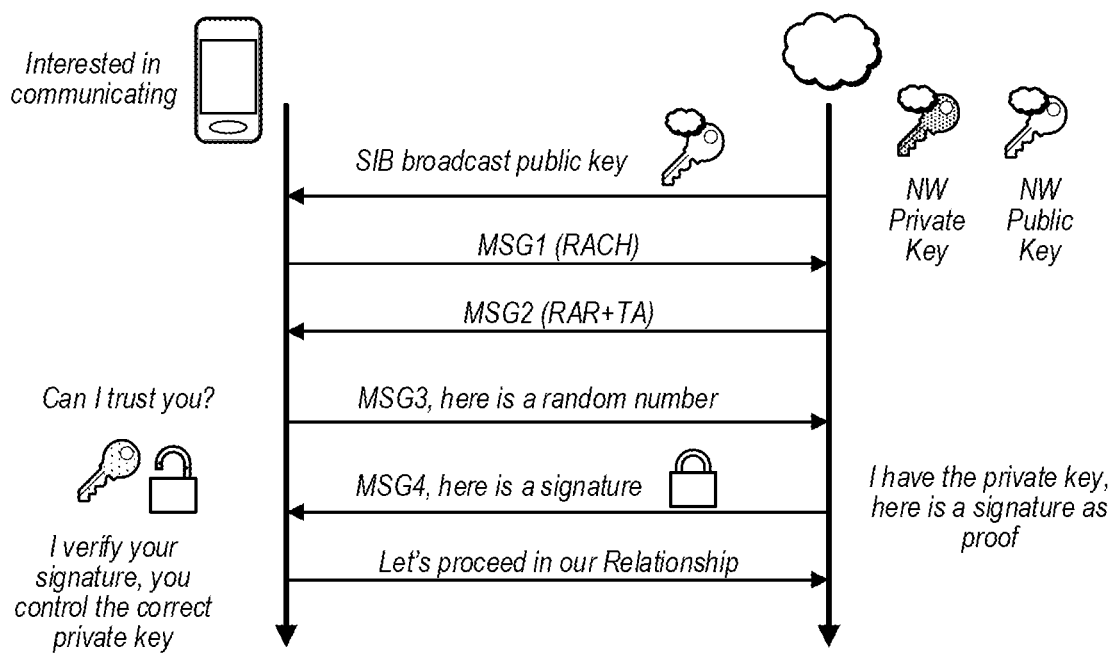

FIGS. 11c-11d illustrate similar communication flow diagrams as FIGS. 11a-11b, but with a simpler communication flow that does not involve both the UE and the base station generating a common shared secret key. As illustrated, in FIG. 11c the BS broadcasts a public key to a UE interested in communicating verified via a trust chain. In response, the UE sends the BS a random number (intended for a one-time use to prevent eavesdropping) and requests that the BS signs the random number with the BS's private key. The BS then responds with a signature that may be based on, for example, the random value or the random value and a time. The UE may then verify that the signature is correct and proceed to communicate with the BS. FIG. 11d illustrates a similar communication flow diagram that includes 2 additional random access messages (MSG1 RACH and MSG2 RAR+ TA) between the UE and the BS.

Because a UE typically initiates a DH challenge-response only upon first joining a cell, utilizing the DH challenge-response to perform access-stratum BS authentication may reduce network loading, in some embodiments. The UE may only verify the certificate chain during idle mode re-selection, which may reduce the UE's experience of latency since authentication processing takes place before random access messaging is initiated. In particular, random access latency is not impacted in these embodiments, as no additional handshake messages are added. As an additional benefit, the risk of unauthenticated RRC redirections (e.g., to 2G) may be eliminated by preemptively authentication the identity of the BS.

Figure 14:
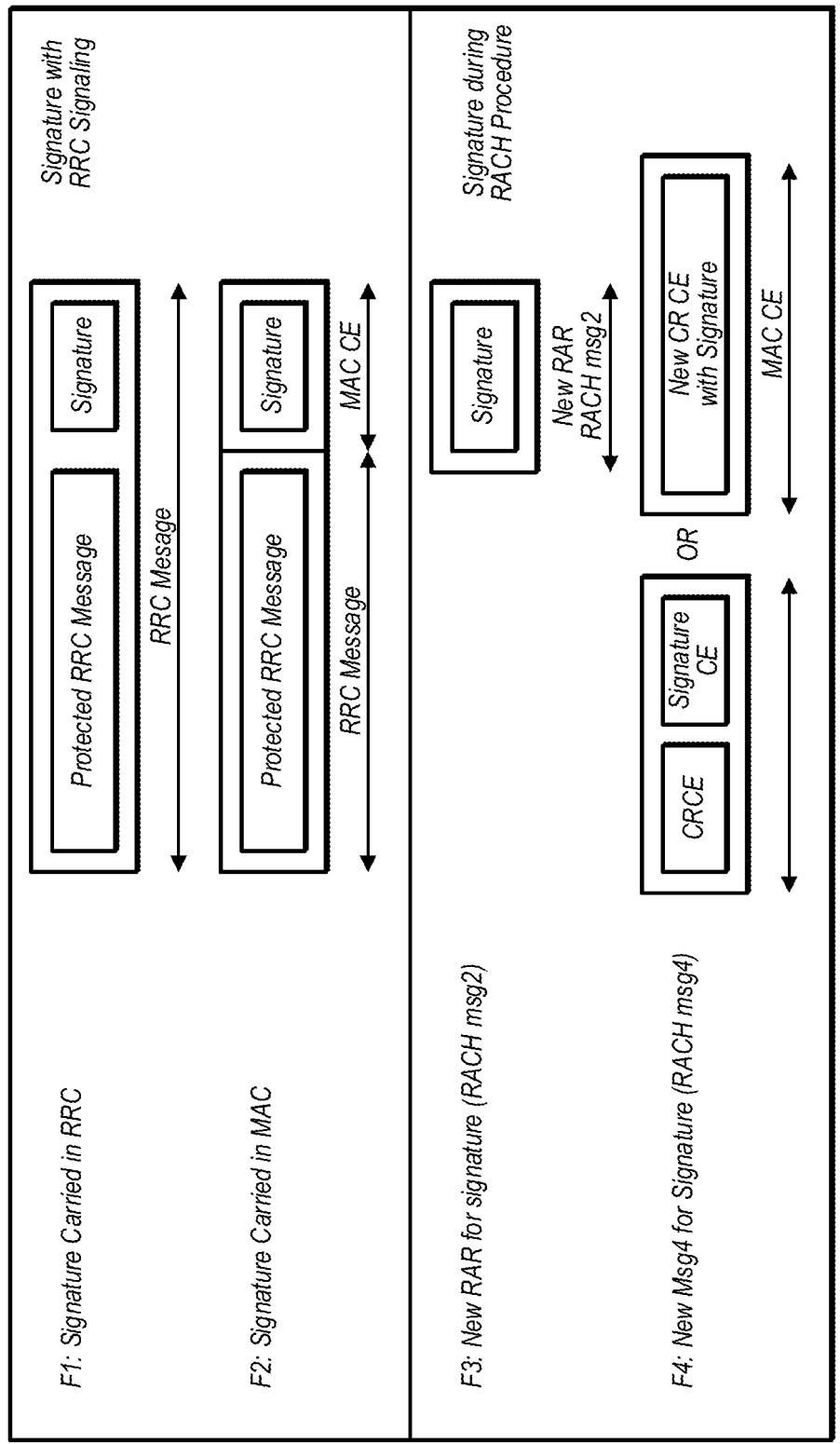
FIG. 14 illustrates a variety of locations for the signature to be embedded in either RRC or MAC messaging, according to various embodiments.

FIG. 14—Signature Carried in RRC or MAC Message Structure

FIG. 14 illustrates a variety of locations for the signature to be embedded in either RRC or MAC messaging, according to various embodiments. The top half of FIG. 14 illustrates embodiments where the signature is carried within RRC signaling. In the embodiment described in F1, an RRC message comprises a protected RRC message with the signature embedded at the end of the RRC message. Alternatively, F2 illustrates an embodiment where the signature is carried in a MAC control element (CE) appended at the end of an RRC message. Each of F1 and F2 may be employed for embodiments where the signature is transmitted within a broadcast communication.

The bottom half of FIG. 14 illustrates embodiments where the signature is embedded during a random access control channel (RACH) procedure. In the embodiment described in F3, a new random access response (RAR) message (designated as RACH msg2) is transmitted by the base station specifically to transmit the signature. Alternatively, F4 describes an embodiment where the signature is included within (or potentially appended at the end of) a MAC CE message containing a contention resolution (CR) CE, designated as RACH Msg4. In contrast to F1 and F2, F3 and F4 may be employed for embodiments using unicast signature transmission.

Additional unicast signature transmission embodiments may include transmitting the signature in an RRC connection setup message, or in a special RRC message (e.g., a redirection or reject message). For example, the signature may be included in an RRC connection setup message transmission. In some embodiments, the signature may be introduced in the RRC connection setup message structure. Alternatively, a new signature MAC CE may be introduced, which is transmitted together with the RRC connection setup message. In other embodiments, the signature may be integrated into a special RRC message such as a redirection message or an access stratum capability request message. In these embodiments, the signature may likewise either be introduced within the special RRC message structure or within a new signature MAC CE, which is transmitted together with the special RRC message.

FIGS. 15a-15b illustrates the message structure involved in embedding the signature in RAR format, according to various embodiments. As illustrated in FIG. 15a, for either a UE-specific signature or a cell-specific signature, the signature may be included with MAC RAR information within a MAC subPDU 2 message. When receiving this message, the UE may first check the new MAC RAR for integrity protection (IP). If the IP check fails, the UE may discard the message, set the cell status as barring, and then perform cell re-selection.

Alternatively, as illustrated in FIG. 15b, for a cell-specific signature, the signature may be appended to the MAC subPDU 2 message without MAC RAR information, thus requiring the addition of one additional MAC RAR message in this embodiment for cell-specific signatures.

FIGS. 16a-16d—Including Signature in Broadcast Messaging

Figure 16A:
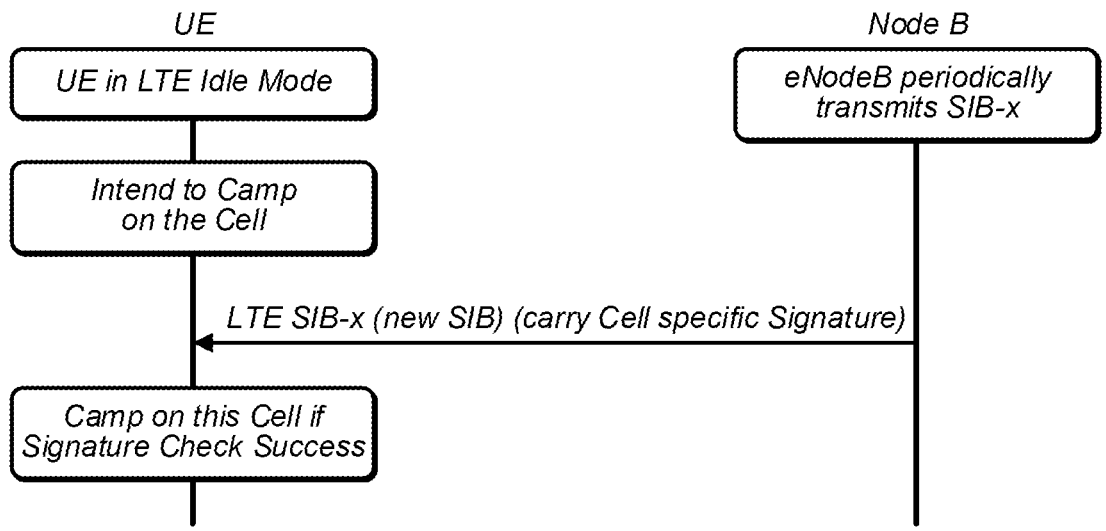
FIGS. 16a-16d are communication flow diagrams illustrating method for a UE to verify the identity of a base station through a broadcast signature, according to various embodiments.
Figure 16B:
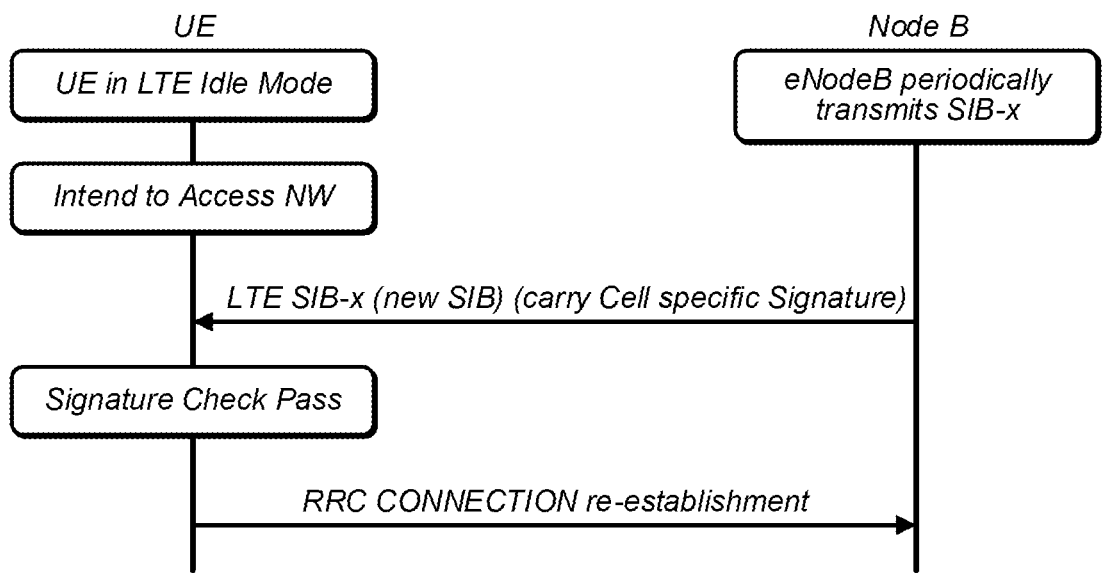
Figure 16C:
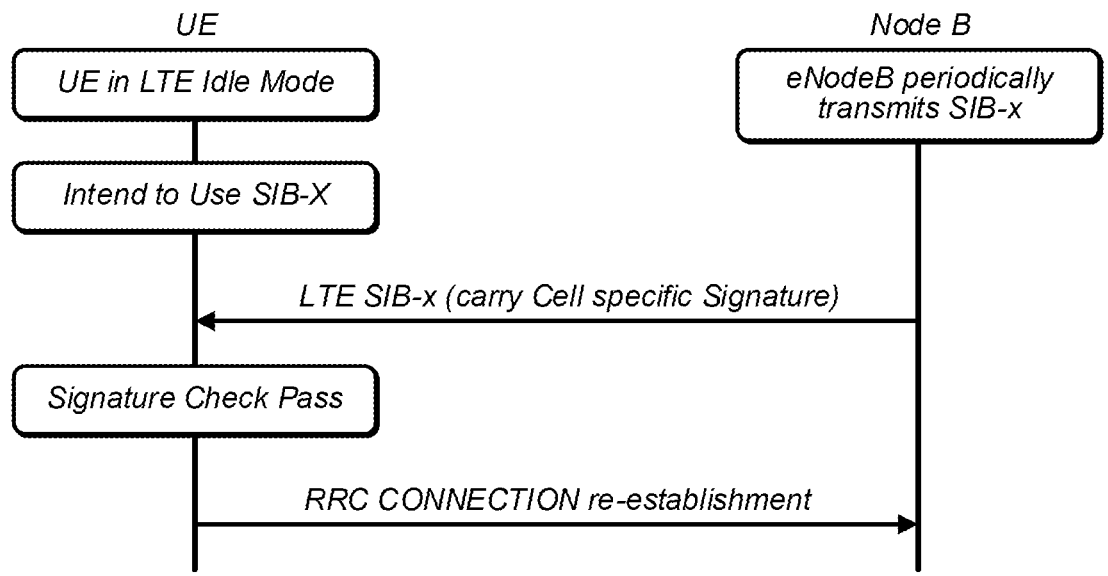

FIGS. 16a-16d are communication flow diagrams illustrating method for a UE to verify the identity of a base station (labeled an "eNodeB") through a broadcast signature, according to various embodiments. As illustrated, the UE may be operating in LTE idle mode, and may determine to camp on a cell (16a), access the network (16b), or use a special system information block, SIB-x (16c-16d). For example, the UE may receive user input to initiate a voice or video call or to access the internet, or the UE may automatically attempt to camp on the cell (e.g., to install an automatic update). As illustrated in FIGS. 16a-16c, the eNodeB may be configured to periodically broadcast a new system information block, designated "SIB-x", which carries a cell-specific signature. According to various embodiments, each special SIB may contain its own unique signature, or there may be a single signature associated with the SIBs in general. Having a unique signature for each SIB may introduce higher overhead, but may reduce latency.

Figure 16D:
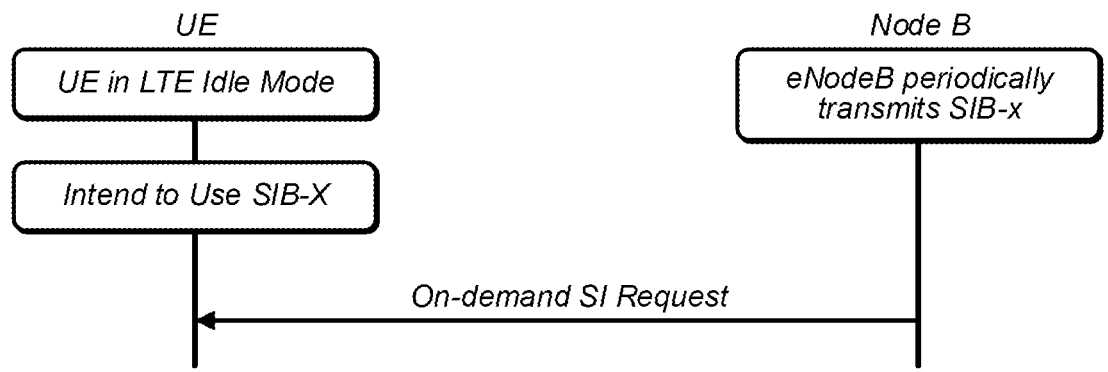

Alternatively, as shown in FIG. 16d, the base station may transmit the SIB-x on demand and in response to a SI request from the UE. In these embodiments, because the SIB-x is only transmitted once and upon request by a UE, it may be more difficult for a replay attack to detect the SIB-x and replay the signature in a future cyberattack. In other words, since the signature transmission and verification are tightly coupled, there is not much time for an imposter base station to attempt to ascertain the signature and use it in a replay attack.

When the UE attempts to camp on the cell, it may monitor for and receive the SIB-x, and may verify whether the signature included within the SIB-x is valid. If the signature is valid, the UE may continue to camp on the cell (16a), or establish an RRC connection with the base station (16a-16b). Alternatively, the UE may camp on the cell first, and then check a signature within a SIB message once the UE intends to access the cell. If the signature is invalid, or if no signature is present within the broadcast message, the UE may leave the cell and prevent future communication with the cell.

SUMMARY

According to embodiments described herein, a base station signature carried within a broadcast message may enable an idle-state UE to distinguish a fake cell during a cell camping procedure. In other embodiments, a signature carried within a special SIB may enable an idle-state UE to distinguish the fake SIB, and not follow the fake command/configuration from the SIB (e.g. ETWS or other emergency messages). In other embodiments, a signature carried within a message during an initial access procedure may enable a UE to distinguish the fake cell during the initial access procedure, and the UE may thereby avoid following fake commands or sending UE information to the fake base station.

The following numbered paragraphs describe additional embodiments of the invention.

In some embodiments, a base station comprises at least one radio, and at least one processor communicatively coupled to the at least one radio. The base station is configured to transmit an authentication message to a user equipment device (UE), determine whether a signature comprised within the authentication message is valid, and continue a connection procedure with the base station based on a determination that the signature is valid.

In some embodiments, the authentication message comprises one of a radio resource control (RRC) connection setup message, a special RRC message, or a random access channel (RACH) message comprising a random access response (RAR) message.

In some embodiments, the authentication message is a broadcast message comprised within a special system information block (SIB). The authentication message may be periodically broadcast. In other embodiments, the authentication message is transmitted in response to an on-demand system information request by the UE.

In some embodiments, the authentication message further comprises a contention resolution message, and the contention resolution message is checked together with the signature. In some embodiments, the authentication message is transmitted as part of an initial access procedure. In some embodiments, the authentication message is transmitted during a Diffie-Hellman (DF) challenge-response authentication procedure.

In some embodiments, a base station comprises a radio and one or more processors couple to the radio. The base station is configured to transmit a first public key to a user equipment device (UE) and receive a second public key from the UE, where the second public key is ephemeral. The base station is further configured to generate an ephemeral secret shared key from the second public key and a private key known to the base station. The base station is further configured to transmit a message authentication code to the UE, wherein the message authentication code is generated based on the ephemeral secret shared key.

In some embodiments, the message authentication code is useable by the UE to verify the identity of the base station.

In some embodiments, a user equipment device (UE) comprises at least one radio, a memory, and at least one processor communicatively coupled to the at least one radio and the memory. The UE is configured to receive a first public key from a base station and generate an ephemeral secret shared key from the first public key and a private key known to the UE. The UE is further configured to transmit a second public key to the base station, where the second public key is ephemeral. The UE is further configured to receive a message authentication code from the base station, where the message authentication code is generated by the base station based on the ephemeral secret shared key.

In some embodiments, the UE is further configured to decode the message authentication code using the ephemeral secret shared key to verify the identity of the base station.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
   at least one radio;
   a memory; and
   at least one processor communicatively coupled to the at least one radio and the memory;
   wherein the at least one radio, the memory, and the at least one processor are configured cause the UE to:
   operate in an idle mode;

while operating in the idle mode, receive an authentication message from a base station as part of an initiation of a connection procedure, wherein the authentication message is a broadcast message comprised within a special system information block (SIB) transmitted from the base station;

determine whether a signature comprised within the authentication message is valid, wherein the signature is determined from content of the special SIB and at least one other broadcast message; and continue the connection procedure with the base station based on a determination that the signature is valid.

2. The UE of claim 1,
wherein the UE is further configured to:
based on a determination that the signature comprised within the authentication message is invalid:
designate the base station as a barred base station; and
perform cell re-selection to initiate a connection procedure with another base station.

3. The UE of claim 1,
wherein the authentication message is received in response to an on-demand system information request by the UE.

4. The UE of claim 1,
wherein the authentication message further comprises a contention resolution message, and
wherein the contention resolution message is checked together with the signature.

5. The UE of claim 1,
wherein the authentication message is received as part of an initial access procedure.

6. The UE of claim 1,
wherein the UE is further configured to:
receive a public key from the base station;
transmit a nonce to the base station as part of a challenge-response authentication procedure;
wherein the authentication message is received during the challenge-response authentication procedure in response to the UE transmitting the nonce to the base station; and
wherein the signature is based on the nonce and a private key of the base station.

7. The UE of claim 1,
wherein the signature is cell specific.

8. The UE of claim 1,
wherein the signature is UE-specific.

9. A method for authenticating an identity of a base station using access stratum transmissions, the method comprising:
by a user equipment device (UE):
receiving an authentication message from the base station while the UE is operating in an idle mode as part of an initiation of a connection procedure, wherein the authentication message is a broadcast message comprised within a special system information block (SIB) transmitted from the base station;
determining, by the UE, whether a signature comprised within the authentication message is valid, wherein the signature is determined from content of the special SIB and at least one other broadcast message; and
continuing the connection procedure with the base station based on a determination that the signature is valid.

10. The method of claim 9,
wherein the authentication message is periodically broadcast by the base station.

11. The method of claim 9, the method further comprising:
by the UE:
based on a determination that the signature comprised within the authentication message is invalid:
designating the base station as a barred base station; and
performing cell re-selection to initiate a connection procedure with another base station.

12. The method of claim 9,
wherein the authentication message further comprises a contention resolution message, and
wherein the contention resolution message is checked together with the signature.

13. An apparatus, comprising:
a processor configured to cause a user equipment (UE) to:
operate in an idle mode;
while operating in the idle mode, receive an authentication message from a base station as part of an initiation of a connection procedure, wherein the authentication message is a broadcast message comprised within a special system information block (SIB) transmitted from the base station;
determine whether a signature comprised within the authentication message is valid, wherein the signature is determined from content of the special SIB and at least one other broadcast message; and
continue the connection procedure with the base station based on a determination that the signature is valid.

14. The apparatus of claim 13,
wherein the processor is further configured to cause the UE to:
based on a determination that the signature comprised within the authentication message is invalid:
designate the base station as a barred base station; and
perform cell re-selection to initiate a connection procedure with another base station.

15. The apparatus of claim 13,
wherein the processor is further configured to cause the UE to:
receive a public key from the base station;
transmit a nonce to the base station as part of a challenge-response authentication procedure;
wherein the authentication message is received during the challenge-response authentication procedure in response to the UE transmitting the nonce to the base station; and
wherein the signature is based on the nonce and a private key of the base station.

16. The apparatus of claim 13,
wherein the signature is cell-specific.

17. The apparatus of claim 13,
wherein the signature is UE-specific.

18. The UE of claim 1,
wherein the authentication message is periodically broadcast by the base station.

19. The method of claim 9,
wherein the signature is cell-specific or UE-specific.

20. The apparatus of claim 13,
wherein the authentication message is periodically broadcast by the base station.

* * * * *